US011936105B2

(12) United States Patent
Sledkov

(10) Patent No.: US 11,936,105 B2
(45) Date of Patent: Mar. 19, 2024

(54) ARTIFICIAL DIELECTRIC MATERIAL AND FOCUSING LENSES MADE OF IT

(71) Applicant: Vasant Limited, Wellington (NZ)

(72) Inventor: Victor Sledkov, Wellington (NZ)

(73) Assignee: VASANT LIMITED, Wellington (NZ)

( * ) Notice: Subject to any disclaimer, the term of this patent is extended or adjusted under 35 U.S.C. 154(b) by 0 days.

(21) Appl. No.: 18/252,774

(22) PCT Filed: Jun. 16, 2022

(86) PCT No.: PCT/NZ2022/050077
§ 371 (c)(1),
(2) Date: May 12, 2023

(87) PCT Pub. No.: WO2022/265524
PCT Pub. Date: Dec. 22, 2022

(65) Prior Publication Data

US 2023/0395986 A1 Dec. 7, 2023

(30) Foreign Application Priority Data

Jun. 16, 2021 (NZ) ........................................ 777305

(51) Int. Cl.
*H01Q 15/10* (2006.01)
*H01Q 15/04* (2006.01)
(Continued)

(52) U.S. Cl.
CPC ............. *H01Q 15/10* (2013.01); *H01Q 15/04* (2013.01); *H01Q 15/06* (2013.01); *H01Q 19/062* (2013.01); *H01Q 25/008* (2013.01)

(58) Field of Classification Search
CPC ........ H01Q 15/10; H01Q 15/04; H01Q 15/06; H01Q 19/062; H01Q 25/008
See application file for complete search history.

(56) References Cited

U.S. PATENT DOCUMENTS 8,518,537 B2 8/2013 Matitsine
9,819,094 B2 11/2017 Matitsine et al.
(Continued)

FOREIGN PATENT DOCUMENTS

NZ 752904 B2 3/2021

OTHER PUBLICATIONS

International Search Report and Written Opinion in PCT/NZ2022/050077, dated Sep. 6, 2022.
(Continued)

*Primary Examiner* — Awat M Salih
(74) *Attorney, Agent, or Firm* — Heslin Rothenberg Farley & Mesiti, P.C.

(57) ABSTRACT

Provided herein is an artificial dielectric material for use in a focusing lens, comprising a plurality of dielectric tubes supported by one or more dielectric supporting elements which fix and separate the dielectric tubes from each other, wherein a surface of each dielectric tube is at least partially covered by at least one conductive element. Also provided are lenses comprising the artificial dielectric materials and methods for manufacture of such materials. The artificial dielectric materials and lenses may provide desirable dielectric and radio wave focusing properties and manufacturing advantages.

20 Claims, 15 Drawing Sheets

(51) Int. Cl.

| | |
|---|---|
| ***H01Q 15/06*** | (2006.01) |
| ***H01Q 19/06*** | (2006.01) |
| *H01Q 25/00* | (2006.01) |

(56) References Cited

U.S. PATENT DOCUMENTS

| | | | | |
|---|---|---|---|---|
| 10,971,823 | B1 | 4/2021 | Sledkov | |
| 2008/0088524 | A1* | 4/2008 | Wang | H01Q 15/0086 343/909 |
| 2010/0053019 | A1* | 3/2010 | Ikawa | H01Q 21/065 343/866 |
| 2018/0034160 | A1 | 2/2018 | Matitsine | |
| 2020/0122387 | A1* | 4/2020 | Polidore | B29C 64/124 |
| 2021/0091478 | A1* | 3/2021 | Sledkov | H01Q 15/08 |
| 2022/0209418 | A1* | 6/2022 | Sledkov | H01Q 15/04 |
| 2022/0416433 | A1* | 12/2022 | Sledkov | H01Q 15/10 |

OTHER PUBLICATIONS

International Preliminary Report on Patentability in PCT/NZ2022/050077, 4 pages, dated Jan. 25, 2023.

* cited by examiner

A-A

ARTIFICIAL DIELECTRIC MATERIAL AND FOCUSING LENSES MADE OF IT

CROSS REFERENCE TO RELATED APPLICATIONS

This application is a U.S. National Phase filing under 35 U.S.C. § 371 of International Application PCT/NZ2022/050077, filed Jun. 16, 2022, and published as WO2022/265524A1 on Dec. 22, 2022. PCT/NZ2022/050077 claims priority from New Zealand patent application 777305, filed Jun. 16, 2021, and the entire contents of each of these applications are hereby incorporated herein by reference.

FIELD OF THE INVENTION

The present invention relates to artificial dielectric materials comprising conductive elements and focusing lenses made thereof for focusing electromagnetic waves.

BACKGROUND

The modern mobile communication market needs multi beam antennas creating narrow beams and operating in different frequency bands. Focusing dielectric lenses are the main part of the most efficient multi beam antennas. The diameter of a focusing lens has to be several wave lengths of the operating frequency to create a narrow beam, therefore some lenses of multi beam antennas for mobile communication have diameter more than 1 m. Such lenses made of usual dielectric materials are often too heavy, therefore much research has been done to create lightweight and low loss lenses providing desirable properties of focusing lenses.

The most well-known lightweight artificial dielectric materials consist of randomly oriented conductive parts mixed with non-conductive parts made of lightweight dielectric material. It is very difficult to manufacture uniform materials having desirable dielectric properties by random mixing of conductive and non-conductive parts, therefore a focusing lens is the most expensive component of multi beam antennas. To improve properties and decrease cost of focusing lenses, development of such materials is constantly continuing.

U.S. Pat. No. 8,518,537 B2 describes a lightweight artificial dielectric material comprising a plurality of randomly orientated small particles of lightweight dielectric material like polyethylene foam containing conductive fibers placed inside of each particle.

Patent application US 2018/0034160 A1 describes a lightweight artificial dielectric material comprising a plurality of randomly orientated small multilayer particles of lightweight dielectric material containing thin conductive patches between layers. This application states that such multilayer particles provide increased dielectric permittivity over particles containing conductive fibers.

All mentioned above lightweight artificial dielectric materials are made by randomly mixing of small particles. However, elimination of metal-to-metal contacts within the material that could lead to passive intermodulation distortion is needed, therefore manufacturing of such materials comprises many stages and cost is high.

Randomly mixing provides isotropic properties of a final material consisting of small particles but some applications need a dielectric material having anisotropic properties. For example a cylindrical lens made of an anisotropic dielectric material can reduce depolarization of electromagnetic wave passed through the cylindrical lens and improve the cross polarization ratio of a multi beam antenna (U.S. Pat. No. 9,819,094 B2). The cylindrical lens made of isotropic artificial dielectric material creates depolarization of the electromagnetic wave passed through such lens therefore an antenna comprising such lens can suffer from high cross polarization.

A lightweight artificial dielectric material providing anisotropic properties and suitable for manufacturing cylindrical lenses was described by NZ patent application 752904. This material consists of short conductive tubes having thin walls and placed inside of a lightweight dielectric material. Tubes are placed in layers. One layer comprises a sheet of a lightweight dielectric material containing plurality of holes. A lightweight dielectric material can be a foam polymer. Tubes are placed in holes made in a sheet of a lightweight dielectric material and contain air inside. Layers containing tubes are separated by layers of a lightweight dielectric material without tubes. The axes of all conductive tubes are directed perpendicular from layers.

Such structure could have effective dielectric permittivity (ε) up to 2.5 for electromagnetic waves spreading along axes of the tubes but its ε for electromagnetic waves spreading in a perpendicular direction is significantly smaller.

The artificial dielectric material described by U.S. Pat. No. 10,971,823 provides less dependence μ and and delay coefficient $n=\sqrt{\varepsilon\mu}$ from direction and polarization of electromagnetic wave because axes of the conductive tubes are directed in different directions but manufacturing of such material is more complicated.

Another shortcoming of the artificial dielectric materials described by NZ 752904 and U.S. Pat. No. 10,971,823 is low wave impedance. Wave impedance (Z) of the artificial dielectric material expressed in terms of effective permittivity ε and effective permeability μ is $$Z = 376.73\sqrt{\frac{\mu}{\varepsilon}}.$$

This formula shows Z decreasing when μ decreases therefore the artificial dielectric materials containing conductive tubes and having μ less than 1 have reduced wave impedance Z than other artificial dielectric materials having μ=1, for example artificial dielectric materials containing thin conductive wires. As a result such artificial dielectric material reflects an electromagnetic wave more than dielectric materials having μ=1.

The artificial dielectric materials described by NZ 752904 and U.S. Pat. No. 10,971,823 cannot be used for manufacturing focusing lenses for multi beam antennas transmitting very high power RF signals because it is difficult to create a suitable ventilation system inside such a foam dielectric. Restricted RF power is therefore another shortcoming of these artificial dielectric materials.

It is desired to provide an improved light artificial dielectric material for manufacturing devices such as focusing lenses and antennas for radio communication.

SUMMARY OF THE INVENTION

Thus, in a first aspect of the invention, there is provided an artificial dielectric material, for use in a focusing lens, comprising a plurality of dielectric tubes supported by one or more dielectric supporting elements which fix and separate the dielectric tubes from each other, wherein a surface of each dielectric tube is at least partially covered by at least one conductive element.

The dielectric tubes may have a cross section in the shape of a circle or a polygon. The distances between neighboring dielectric tubes may be equal, or may be unequal. The dielectric tubes may form a substantially circular, substantially square, or substantially hexagonal array.

The dielectric supporting element, which fixes and separates the dielectric tubes from each other may be a thin dielectric sheet containing holes for the dielectric tubes. In another embodiment, this integer may be a foam dielectric material containing holes for the dielectric tubes. In another embodiment, this aspect may comprise rods disposed in holes made in the dielectric tubes and washers disposed on the rods between the dielectric tubes.

Preferably, conductive element is a short conductive tube, which more preferably includes a slit along its length so as to provide a gap between two longitudinal edges. The conductive elements may contain slots in the material of the tube, and the tube preferably has a length in the range 0.2-5.0 times the diameter of the tube. Preferably, the conductive elements are made of aluminium, however they may be made of a conductive adhesive tape, or may comprise a conductive film adhered to the dielectric tubes by a dielectric adhesive tape.

The conductive elements disposed on adjacent dielectric tubes may be disposed in the same plane to form layers of the conductive elements. In another embodiment, the conductive elements on selected dielectric tubes are disposed in a differing plane to the conductive elements disposed on adjacent dielectric tubes.

The conductive elements may be made by sputtering of conductive material on walls of the dielectric tubes, or may be made by chemical precipitation of conductive material on walls of the dielectric tubes.

In another aspect of the invention, there is provided a focusing lens made of the artificial dielectric material of the described invention. Preferably, the focusing lens may be a cylindrical focusing lens, a spherical focusing lens, or a convex focusing lens.

The dielectric tubes may be disposed in a symmetrical manner about the central axis of the lens. They may be disposed in a substantially circular array about the central axis of the cylindrical lens. Alternatively, they may be disposed in a substantially hexagonal array about the central axis of the cylindrical lens. Alternatively, they may be disposed radially about the central axis of the cylindrical lens.

The distances between neighbouring dielectric tubes may be progressively larger towards the outer contour of the cylindrical lens than the distances between neighbouring tubes near the central axis of the cylindrical lens.

The diameters of the dielectric tubes may be progressively smaller toward the outer contour of the lens than the diameters of the dielectric tubes near the central axis of the cylindrical lens.

The length of each of the conductive elements disposed on the dielectric tubes may decrease towards the ends of the dielectric tubes.

The distances between the conductive elements disposed on the dielectric tubes may decrease towards the ends of the dielectric tubes.

The number of conductive elements disposed on each dielectric tube may decrease towards the outer contour of the lens.

The dielectric tubes disposed furthest from the central axis of the focusing lens may include the one or more conductive elements at or near the middle of the dielectric tube and not at or near the ends of the tubes.

In another aspect of the invention, there is provided a method for manufacturing an artificial dielectric material according to the invention for use in a focusing lens, comprising: partially covering a plurality of dielectric tubes with a plurality of conductive elements, and fixing and separating the dielectric tubes from each other by way of one or more dielectric supporting elements.

By providing artificial dielectric materials of this nature, the invention provides a light artificial dielectric material having less dependence n and Z from the direction and polarization of electromagnetic waves spreading through the material.

Further, the materials of the invention are simpler for manufacturing compared with known analogues and are suitable for production of focusing lenses and dielectric antennas for radio communication. The provided material has to provide desirable dielectric properties and reliable isolation of conductive elements from each other.

By way of its configuration, the artificial dielectric material of the invention is suitable for manufacturing focusing lenses for multi beam antennas transmitting very high power RF signals.

Because $\varepsilon$ depends on the angle between the direction of an electromagnetic wave crossing the material and axes of conductive elements, existing artificial dielectric materials do not suit for many applications requiring an isotropic dielectric material providing the same value of $\varepsilon$ for any direction and polarization of electromagnetic wave. For example spherical Luneburg lenses have to be made of isotropic dielectric material having the same $\varepsilon$ for any direction and polarization of electromagnetic wave to maintain polarization of an electromagnetic wave passed through a spherical lens. Therefore a need exists to create the artificial dielectric material providing lesser dependence of $\varepsilon$ from direction and polarization of electromagnetic wave crossing the material compared with known materials. At the same time manufacturing of such material has to be simpler than manufacturing of known lightweight artificial materials made by randomly mixing of small elements containing conductive elements isolated from each other.

Focusing properties of an artificial dielectric material depend on a delay coefficient $n=\sqrt{\varepsilon\mu}$, where P is efficient magnetic permeability. As an electromagnetic wave passes through the known artificial dielectric material, this excites currents in the conductive material and $\mu$ of such material is less than 1. The biggest circular currents flow on the wall of a conductive tube in a direction perpendicular to the axis of the conductive tube when the magnetic field of an electromagnetic wave is directed in parallel to the axis of a conductive tube. As a result $\mu$ and n for such polarization are less than for other polarizations. Artificial dielectric materials containing the conductive tubes suffer from such effect therefore it is needed to find other shapes of conductive elements to increase $\mu$ and delay coefficient n.

Diameter of the dielectric tubes is preferably about twenty times less than the wave length of the operating frequency to provide acceptable dependence of properties of the artificial dielectric material versus frequency. The length of the conductive elements may be 0.2-5.0 times their respective diameter dependent on the desired properties of the artificial dielectric material.

Density of the provided artificial dielectric material mainly depends on the dielectric tubes' weight and the thickness and material of the conductive elements.

Efficient dielectric permittivity (ε) is approximately 1.8 when distances between the dielectric tubes and the conductive elements disposed on the same dielectric tube is approximately 1 mm. It is possible to decrease the density of the artificial dielectric material by decreasing the thickness of the conductive elements. Sputtering or chemical precipitation of a conductive material on walls of the dielectric tubes can provide conductive elements having thickness of walls less than 0.01 mm.

Delay coefficient n of the provided artificial dielectric material depends on the shape of the conductive elements and distances between the dielectric tubes and between the separated conductive elements on the tubes. Also, n depends on the polarization and direction of an electromagnetic wave spreading through the material. Thus the provided artificial dielectric material is mainly an anisotropic material, but it can also provide isotropic properties.

For example, when an electromagnetic wave crosses the material along the axes of the dielectric tubes, the conductive elements have a shape of a short tubes, and distances between the neighboring dielectric tubes are equal, n doesn't depend on polarization.

When an electromagnetic wave crosses the provided material perpendicular to the axes of the dielectric tubes, n depends on polarization. Large dependence on polarization occurs when distances between the tubes are significantly less or bigger than distances between the distinct conductive elements disposed on the dielectric tube. Delay coefficient (n) for E polarization directed along the axes of the dielectric tubes is bigger than n for E polarization directed across the axes of the dielectric tubes when distances between the conductive elements disposed on one dielectric tube are significantly smaller than distances between the dielectric tubes. Delay coefficient (n) of E polarization along the axes of the dielectric tubes is smaller than n of E polarization across the axes of the dielectric tubes when distances between the conductive elements disposed on one dielectric tube are significantly bigger than distances between the dielectric tubes. Materials having a large difference between n of two orthogonal polarizations can transfer the linear polarized electromagnetic wave to circular polarized one.

Delay coefficient (n) of both polarizations could be equal or slightly different when distances between the dielectric tubes and distances between the conductive elements are approximately equal.

The artificial dielectric material of the invention provides less dependence of delay coefficient (n) on polarization of electromagnetic waves than other materials because μ of the proposed material is less dependent on polarization of an electromagnetic wave. The artificial dielectric material of the invention has larger wave impedance (Z) than other materials therefore reflection from the material of the invention is less than reflection from known materials. As a result focusing lenses made of the provided material are better matched with air than other materials.

The proposed artificial dielectric material having larger μ provides larger delay coefficient n than the known artificial dielectric materials because ε of both materials is almost equal.

The dielectric tubes are suitable for creation of a material with improved ventilation therefore the provided material can handle more RF power than other materials. Thus the provided material could be useful for several applications.

Using the materials described above, the invention also provides focusing lenses made of the artificial dielectric material. Different kinds of focusing lens could be made of the provided artificial dielectric material, for example cylindrical, spherical and convex focusing lenses. Several embodiments of lenses described below show different distribution of ε towards outer the contour of the lens.

Advantageously, the process of manufacturing such lenses does not include mixing of small parts. The structure of the artificial dielectric material of the invention eliminates moving and settling of the conductive elements under vibration and other environmental factors providing long term physical stability and performance of the lens.

The reliable isolation of the conductive elements by the lightweight dielectric material of the invention eliminates the possibility of metal-to-metal contacts that could lead to passive intermodulation distortion. Therefore the provided artificial dielectric material is suitable for manufacturing of lenses for base station antennas having very tight specifications for passive intermodulation distortion.

The artificial dielectric material of the invention can provide both homogenous ε and/or variable ε along the dielectric tubes and across these. This applies also to lenses made of the material.

The artificial dielectric material of the invention provides air ventilating channels which allows lenses made of the artificial dielectric material to focus high power electromagnetic waves.

The words "tubular" or "tube" as used in relation to the invention are broad in nature and refer to an elongated hollow object. Such object may have a cross-section which is circular, but equally may have another cross-sectional shape including, but not limited to a polygon such as a square, hexagon or octagon such as described and depicted.

BRIEF DESCRIPTION OF THE DRAWINGS

In further describing the invention, reference is made to the accompanying drawings by way of example only in which.

DETAILED DESCRIPTION

The present invention provides a light weight artificial dielectric material including a plurality of conductive elements on the surface of dielectric tubes. The dielectric tubes may be supported by dielectric supporting elements which fix and locate the positions of the dielectric tubes and separating these from each other. Such structure delays an electromagnetic wave passing through and acts like a dielectric material when dimensions of the conductive elements are much less than wave length.

Figure 1A:
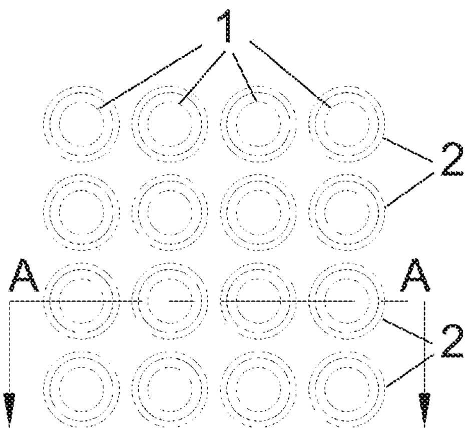
FIGS. 1*a* and 1*b* show a top view and a cross section, respectively, of one embodiment of a material of the present invention containing dielectric tubes of a circular cross-section, and having a plurality of conductive elements which are short conductive tubes disposed on the external surface of the dielectric tubes.
Figure 1B:
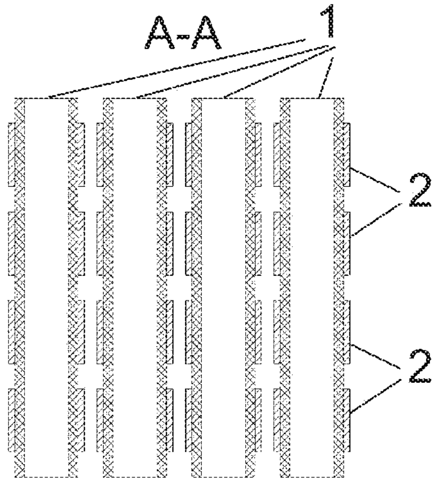

FIGS. 1*a* and 1*b* show a top view and a cross section of one embodiment of the present invention containing dielectric tubes 1 of a round shape and conductive elements 2 in the shape of short conductive tubes disposed on the surface of the dielectric tubes. In this case, the dielectric tubes form square array. However, the relative orientation of the dielectric tubes from each other can be varied, such as a generally circular or hexagonal array, for example. As shown in FIG. 1*b*, conductive elements fixed on neighboring dielectric tubes are disposed adjacent to each other.

By the arrangement of the invention, having the conductive elements on the surface of dielectric tubes, this provides a more consistent and correct position between the conductive elements 2 disposed on the same dielectric tube 1, than in the case of conductive elements placed directly into a foam dielectric material, for example. As a result, properties of the provided artificial dielectric material are more stable than properties of other artificial dielectric materials.

The provision of dielectric tubes increases the capacity between conductive elements 2 disposed on the same dielectric tube 1. As a result, delay coefficient (n) of the provided artificial dielectric material is bigger than n of other dielectric materials. By providing dielectric tubes, the material could be connected to a cooling system in order to push a cold air through the tubes to cool the conductive elements from absorbed RF power.

Figure 1C:
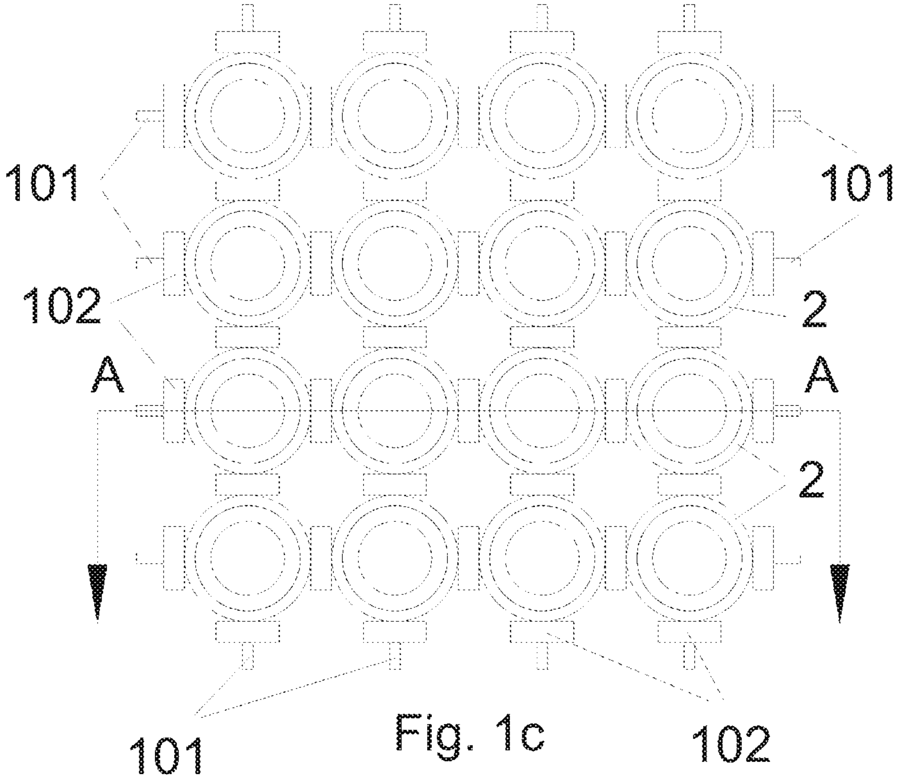
FIGS. 1*c* and 1*d* show a top view and a cross-section, respectively, of another embodiment of the present invention, whereby dielectric tubes corresponding to those shown in FIGS. 1*a* and 1*b* are fixed and separated from each other by dielectric rods and dielectric washers.
Figure 1D:
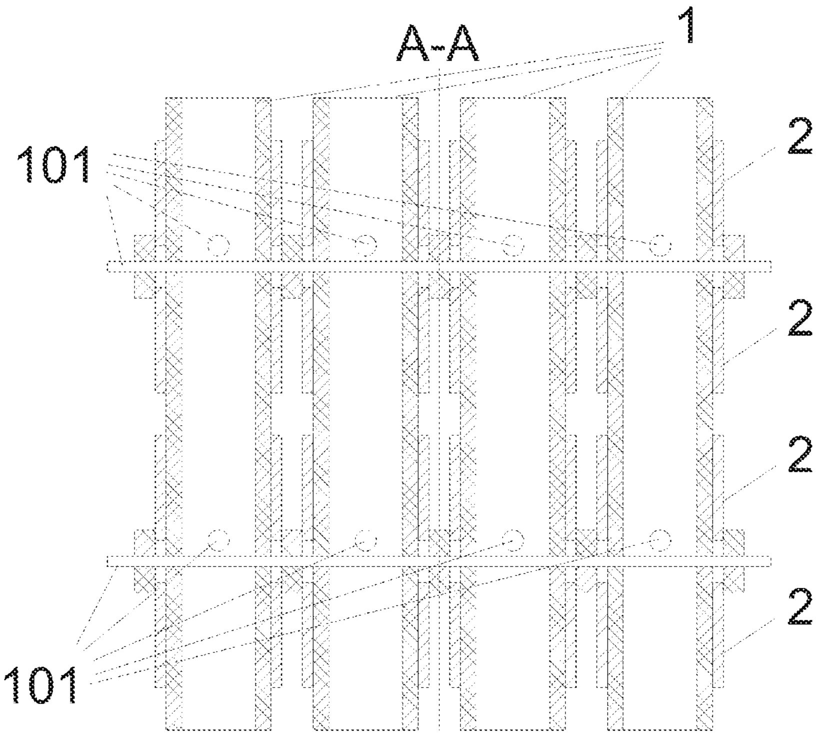

FIGS. 1*c* and 1*d* show one example of dielectric supporting elements for use in the artificial dielectric materials of the invention in a top view and a cross section of one embodiment of the present invention. The embodiment includes dielectric tubes 1 of a circular cross section and conductive elements 2 in the shape of short conductive tubes disposed on the surface of the dielectric tubes 1. The dielectric supporting elements in this embodiment comprise thin dielectric rods 101, which are disposed in holes made in adjacent dielectric tubes 1 so as to join, fix and separate the tubes. Dielectric washers 102 are disposed on dielectric rods 101 between the dielectric tubes 1 for the purpose of separation. Such a configuration having dielectric supporting elements 101 and 102 provides additional channels for air ventilation between the dielectric tubes 1. As a result, air can penetrate through the provided dielectric material in any directions and decrease wind load of focusing lens made of such a dielectric material. Also thin dielectric washers 102 could be used to decrease distances between dielectric tubes 1 and increase the delay coefficient of the provided artificial material. In an alternative arrangement, thin dielectric rods 101 could be fixed on a frame surrounding the material.

As shown in the following figures and their corresponding description, alternative dielectric supporting elements include one or more unitary dielectric supporting elements such as a sheet of a dielectric material comprising holes which accommodate the dielectric tubes to fix and separate the dielectric tubes from each other. Such a sheet could be combined with one or more others for use in the production of lenses. A further alternative is the use of a unitary dielectric supporting element which is a dielectric foam which has holes which can accommodate the plurality of dielectric tubes to fix and separate the dielectric tubes from each other.

Figure 2A:
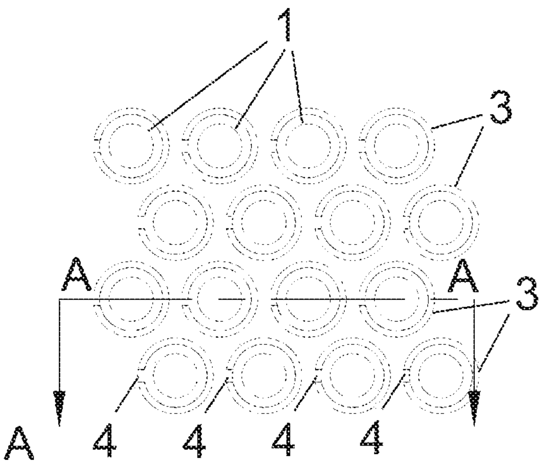
FIGS. 2*a* and 2*b* show a top view and a cross-section, respectively, of another embodiment of a material of the present invention, whereby the surface of dielectric tubes with a circular cross-section are partially covered by a plurality of conductive elements in the shape of a short conductive tube having a slit along its length so as to provide a gap between two longitudinal edges, each of which is disposed on the external surface of the dielectric tubes.
Figure 2B:
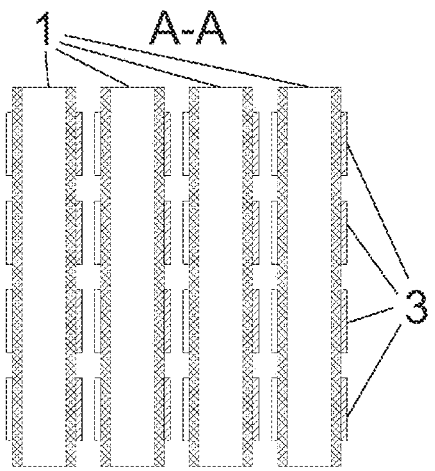

FIGS. 2a and 2b show a top view and a cross section of another embodiment of the present invention containing dielectric tubes 1 of a circular cross section and conductive elements 3 which are short conductive tubes having a slit 4 along their length so as to provide a gap between two longitudinal edges, where the conduct elements are disposed on the surface of the dielectric tubes. The dielectric tubes in FIG. 2a form a hexagonal array. The conductive elements fixed on neighboring dielectric tubes are disposed adjacent to each other as shown in FIG. 2b. Dielectric supporting parts aren't shown in this figure. The longitudinal slit 4 decreases circular currents flowing on the conductive element 3 therefore such elements provide larger μ of the artificial dielectric material than conductive elements in a shape of short conductive tubes. As a result the provided artificial dielectric material has larger n and is better matched with free space than other artificial dielectric materials.

Figure 3A:
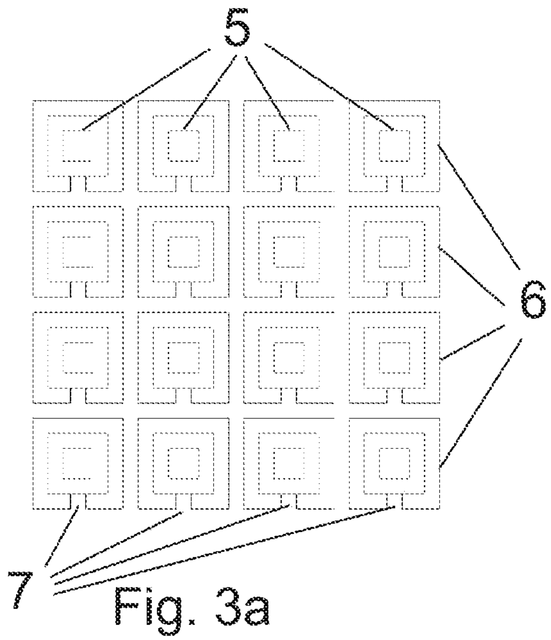
FIGS. 3*a* and 3*b* show a top view and a side view of another embodiment of the material of the present invention containing dielectric tubes of a square cross-section which are partially covered by conductive elements in the shape of short conductive tubes of a square cross-section, each having a slit along its length so as to provide a gap between two longitudinal edges, where each of the tubes are disposed on the external surface of the square dielectric tubes.
Figure 3B:
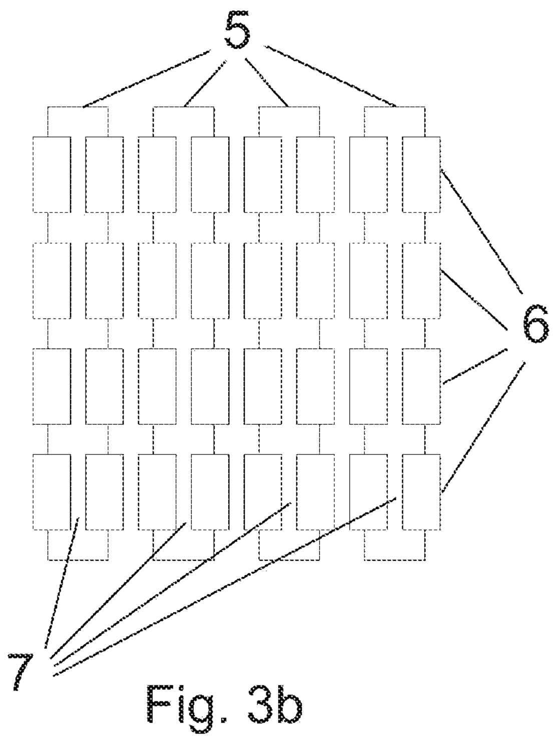

FIGS. 3a and 3b show a top view and a side view of another embodiment of the present invention containing dielectric tubes 5 having a square cross-section and corresponding conductive elements 6 in the shape of short conductive tubes of square profile with a slit 7 separating two longitudinal edges disposed on the surface of the dielectric tubes. The dielectric tubes of FIG. 3a form a square array. The conductive elements fixed on neighboring dielectric tubes are disposed adjacent to each other.

Figure 4A:
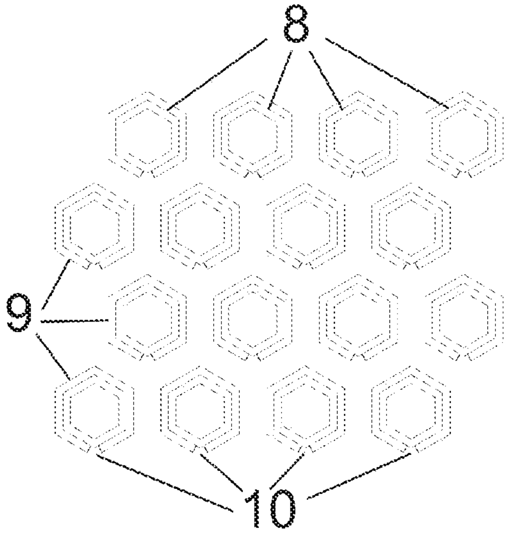
FIGS. 4*a* and 4*b* show a top view and a side view of another embodiment of the present invention containing dielectric tubes having a hexagonal cross section which are partially covered by conductive elements in the shape of short conductive tubes of a hexagonal cross-section, each having a slit along its length so as to provide a gap between two longitudinal edges, where each of the tubes are disposed on the external surface of the dielectric tube, and where the conductive elements on adjacent dielectric tubes are positioned at differing heights from each other.
Figure 4B:
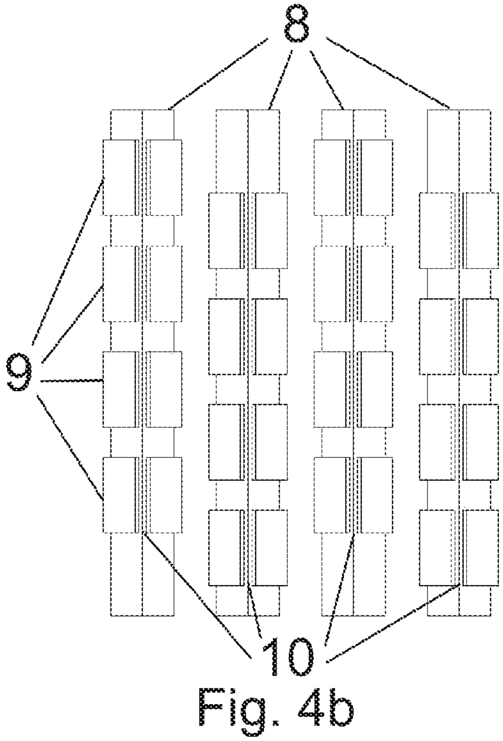

FIGS. 4a and 4b show a top view and a side view of another embodiment of the present invention containing dielectric tubes 8 having hexagonal cross section and corresponding conductive elements 9 disposed on the surface of the dielectric tubes and having a slit 10 along their length so as to provide a gap between two longitudinal edges. As shown in FIG. 4a, the dielectric tubes form a hexagonal array. The conductive elements fixed on some dielectric tubes are shifted along the dielectric tubes in relation to the conductive elements disposed on the surface of adjacent dielectric tubes so that these are in different planes. This shift increases capacity between conductive elements 9 disposed on the same dielectric tube 8 and decreases capacity between conductive elements 9 disposed on neighboring dielectric tubes. As a result the provided artificial dielectric material has more desirable electric properties than other dielectric materials.

Figure 5A:
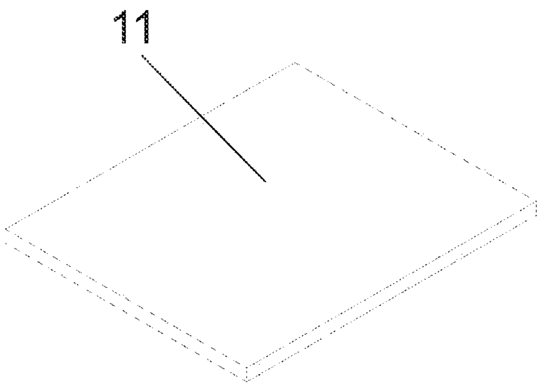
FIGS. 5*a*-5*b* show perspective views of conductive elements of different shapes made of a conductive adhesive tape before being placed on the surface of a dielectric tube.

FIG. 5a shows a conductive element 11 of rectangular shape made of a conductive adhesive tape before installation on the surface of a dielectric tube. The thickness of such element could be about 1 mm or could be less than 0.05 mm, in which case density of the artificial dielectric material can be reduced.

Figure 5B:
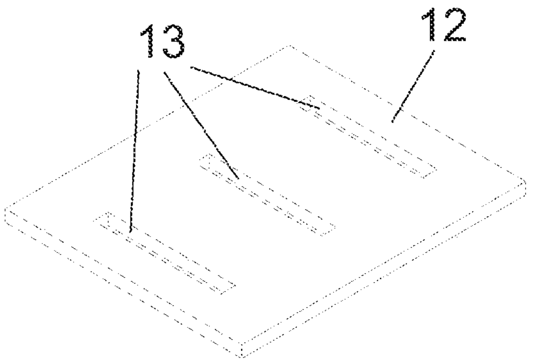

FIG. 5b shows a conductive element 12 of rectangular shape made of a conductive adhesive tape before installation on the surface of a dielectric tube. Slots 13 decrease circular currents flowing on the conductive element 12 therefore such elements increase μ of the artificial dielectric material. As a result the artificial dielectric material has a larger delay coefficient (n).

Figure 5C:
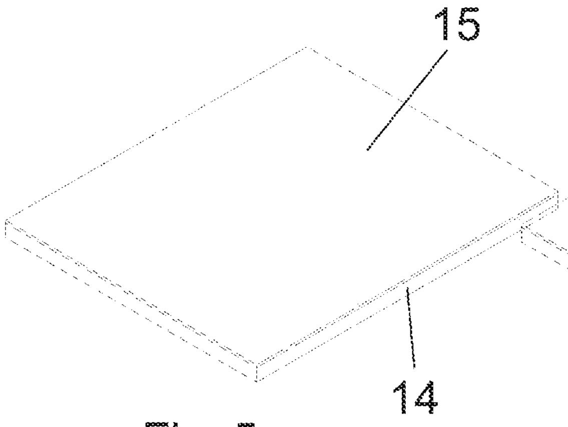
FIGS. 5*c*-5*f* show perspective views of conductive elements of different shapes made of a dielectric adhesive tape covered by a conductive film before installation on the surface of a dielectric tube.

FIG. 5c shows dielectric material 14 of rectangular shape made of a dielectric adhesive tape covered by a conductive film 15 before installation on the surface of a dielectric tube. Thickness of such material could be less than 0.01 mm therefore density of the artificial dielectric material can be reduced.

Figure 5D:
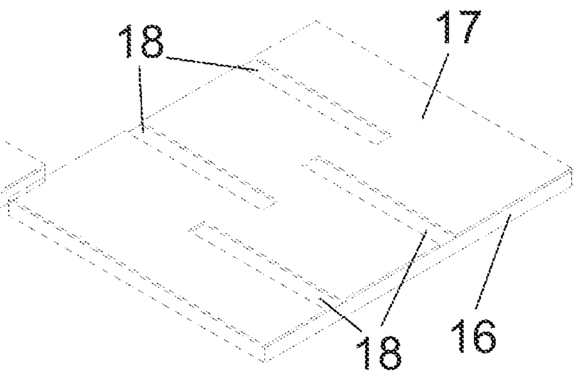

FIG. 5d shows dielectric material 16 of rectangular shape made of a dielectric adhesive tape covered by a conductive film 17 before installation on the surface of a dielectric tube. Slots 18 decrease circular currents flowing on the conductive element 12 in order to increase μ of the artificial dielectric material. As a result the artificial dielectric material has a larger delay coefficient (n).

Figure 5E:
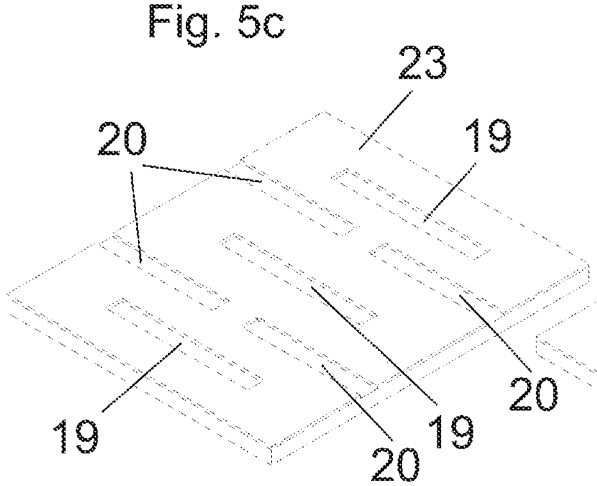
Figure 5F:
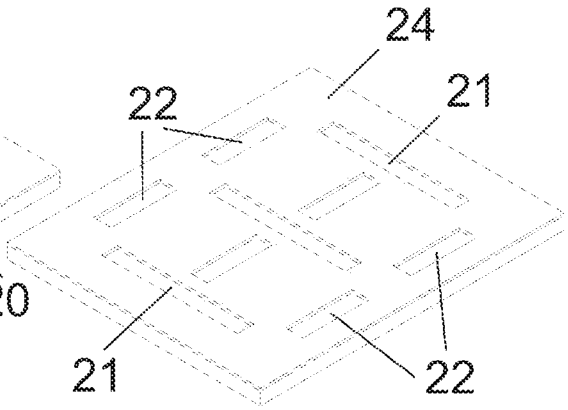

FIGS. 5e and 5f show other possible dispositions of slots 19-22 in order to decrease circular currents flowing on the conductive elements 23 and 24. Further slot arrangements beyond those shown are possible and within the knowledge of one skilled in the art.

Figures 6A, 6B, 6C:
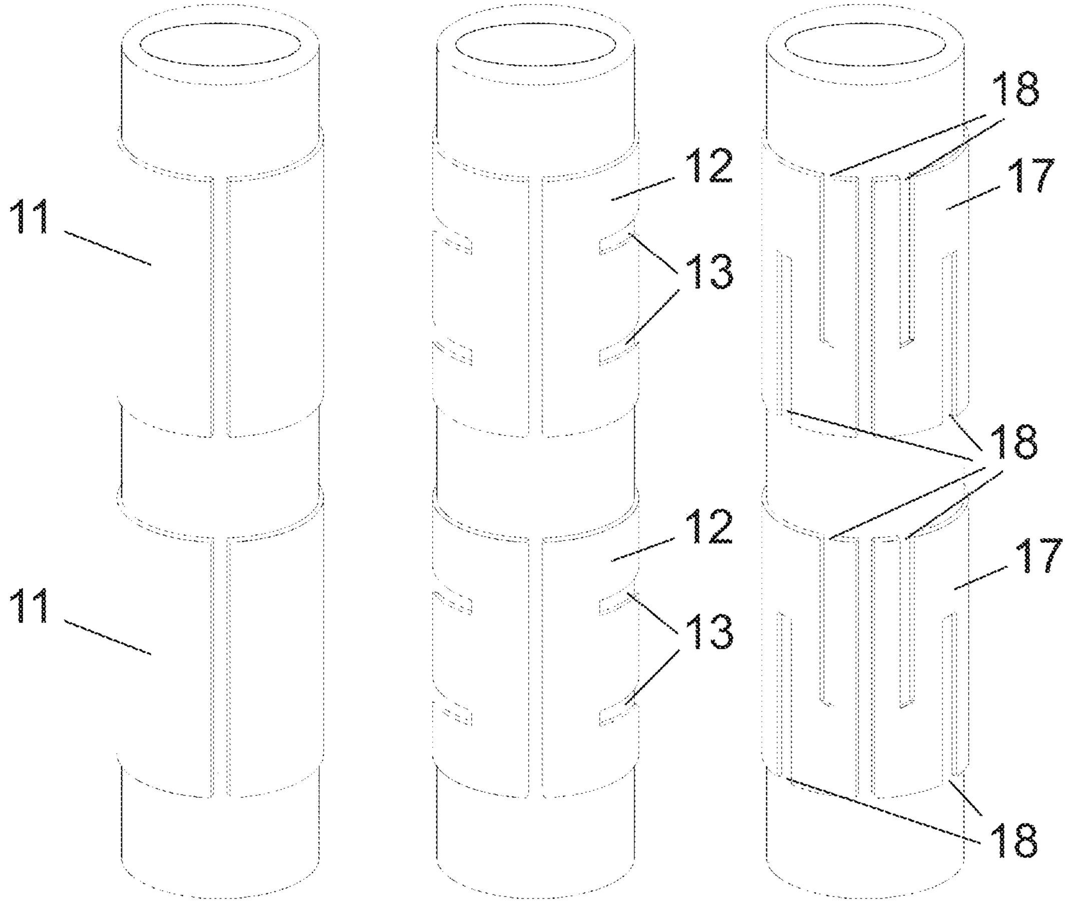
FIGS. 6*a*-6*c* show perspective views of conductive elements of different shapes disposed on the surface of the dielectric tubes.

FIG. 6a shows conductive elements 11 having a shape of short conductive tubes with a slit along their length so as to provide a gap between two longitudinal edges disposed on the surface of a dielectric tube.

FIG. 6b shows conductive elements 12 disposed on the surface of a dielectric tube, where the conductive elements 12 contain slots 13 which decrease circular currents and increase P of the artificial dielectric material.

FIG. 6c shows conductive elements 17 disposed on the surface of a dielectric tube. Conductive elements 17 contain slots 18 which decrease circular currents and increasing μ of the artificial dielectric material.

As it can be seen, there are a wide range of configurations for the conductive elements for use in the invention. Generally, the or each conductive tube has a length in the range 0.2-5.0 times the tube's diameter, which can be varied based on end use and compatibility requirements. The conductive element may be made from a conductive metal such as aluminium, or may alternatively be copper, nickel, silver, gold, or another suitable conductive metal.

Figure 7A:
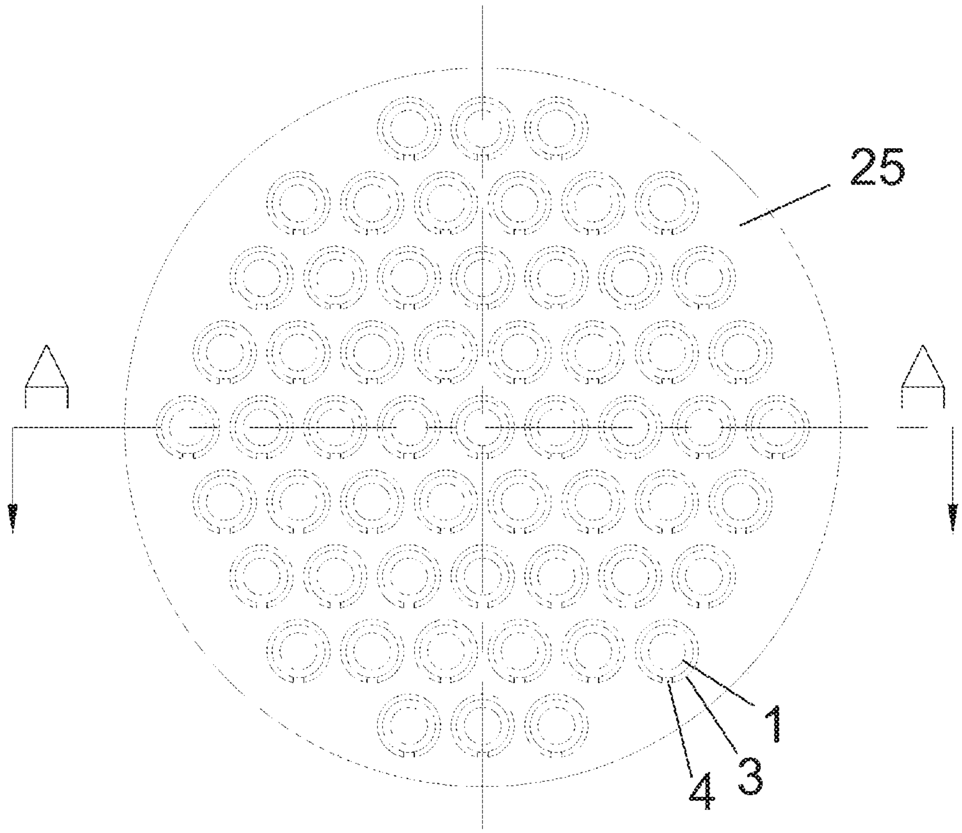
FIG. 7*a* shows a top view of a cylindrical lens containing the dielectric tubes and conductive elements disposed on the surface thereof, where distances between neighboring dielectric tubes are equal.

FIG. 7a shows a top view of a cylindrical lens containing the dielectric tubes 1 and conductive elements 3 disposed on the surface thereof. The dielectric tubes 1 are disposed in holes made in a unitary dielectric supporting element 25, whereby distances between neighboring dielectric tubes are equal. The conductive elements 3 have the shape of short tubes with a slit 4 along their length so as to provide a gap between two longitudinal edges which decreases circular currents and increases μ of the artificial dielectric material.

Figure 7B:
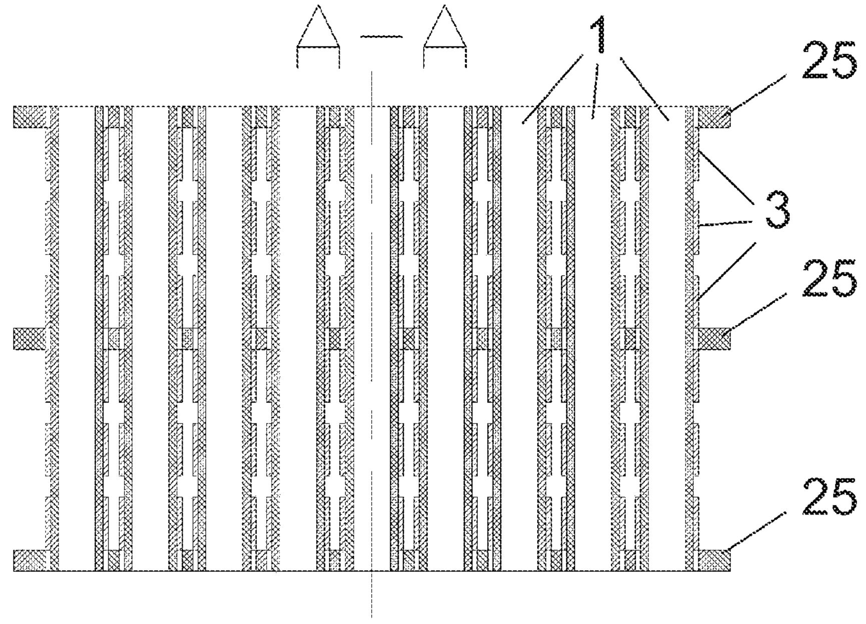
FIGS. 7*b*-7*d* show cross sections of different embodiments of the cylindrical lens shown in FIG. 7*a* where the conductive elements have different disposition and the dielectric supporting elements differ.

FIG. 7b shows a cross section of the cylindrical lens shown in FIG. 7a where the conductive elements 3 placed on neighboring dielectric tubes 1 are disposed adjacent to each other. The cylindrical lens pictured contains three unitary dielectric supporting elements 25 which have the shape of a thin dielectric circle.

Figure 7C:
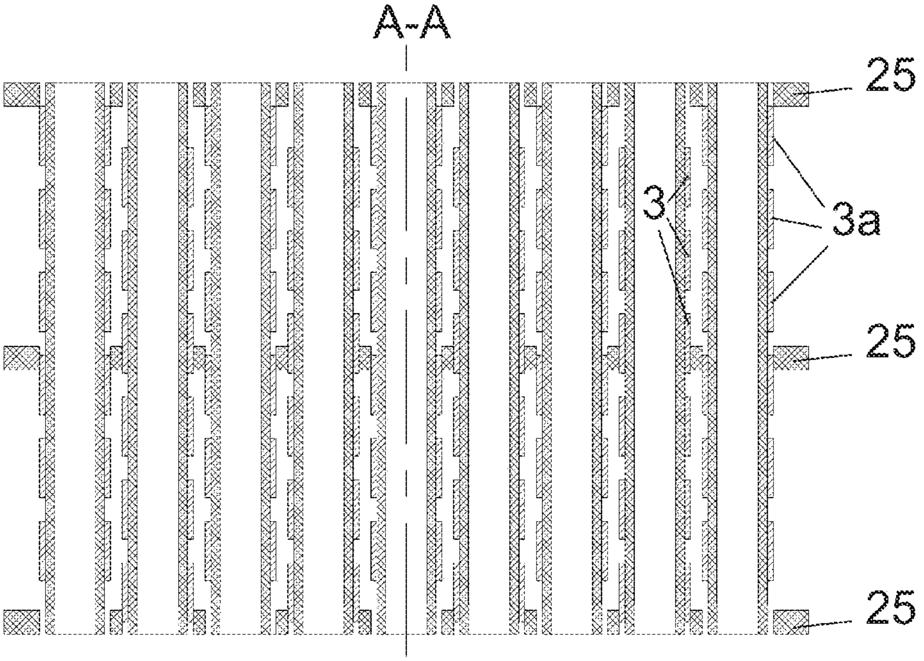

FIG. 7c shows a cross section of an alternative cylindrical lens corresponding to FIG. 7a where the conductive elements 3 disposed on some dielectric tubes 1 are shifted along the dielectric tubes in relation to the conductive elements 3a disposed on the surface of adjacent dielectric tubes so that these are in different planes. The cylindrical lens contains three unitary dielectric supporting elements 25 having the shape of a thin dielectric circle.

Figure 7D:
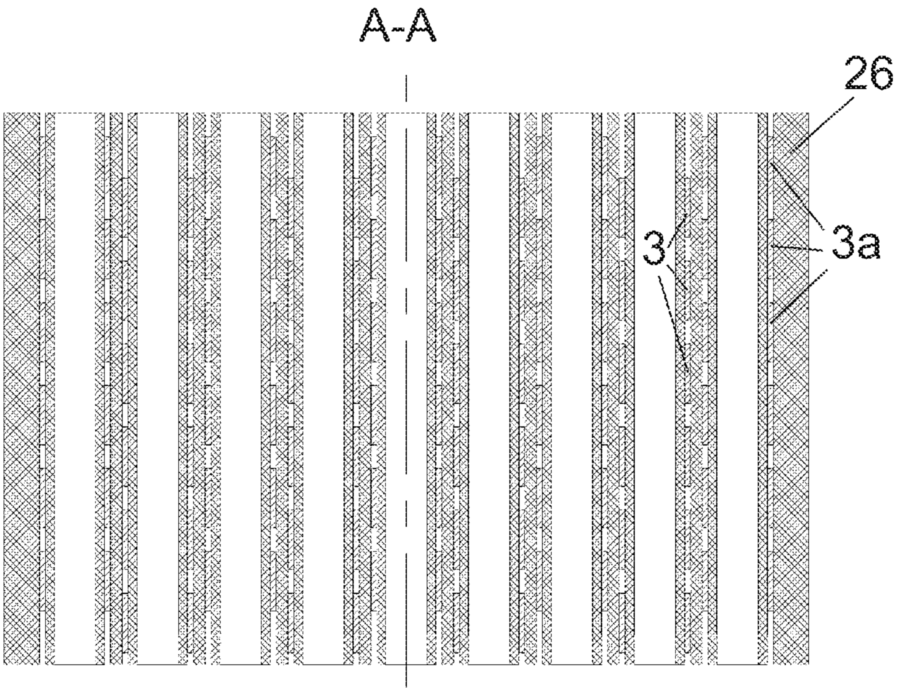

FIG. 7d shows a cross section of an alternative cylindrical lens corresponding to FIG. 7a where the conductive elements 3 disposed on some dielectric tubes are shifted along the dielectric tubes in relation to the conductive elements 3a disposed on the surface of adjacent dielectric tubes so that these are in different planes. The cylindrical lens contains one dielectric supporting element 26 which is a cylinder made of a foam dielectric material having holes to accommodate the dielectric tubes.

Manufacturing of a single cylinder as a dielectric supporting element for the dielectric tubes may be a favoured alternative to an arrangement manufactured from a plurality of sheets of a dielectric material. This may provide an advantage over other artificial dielectric materials.

Figure 8:
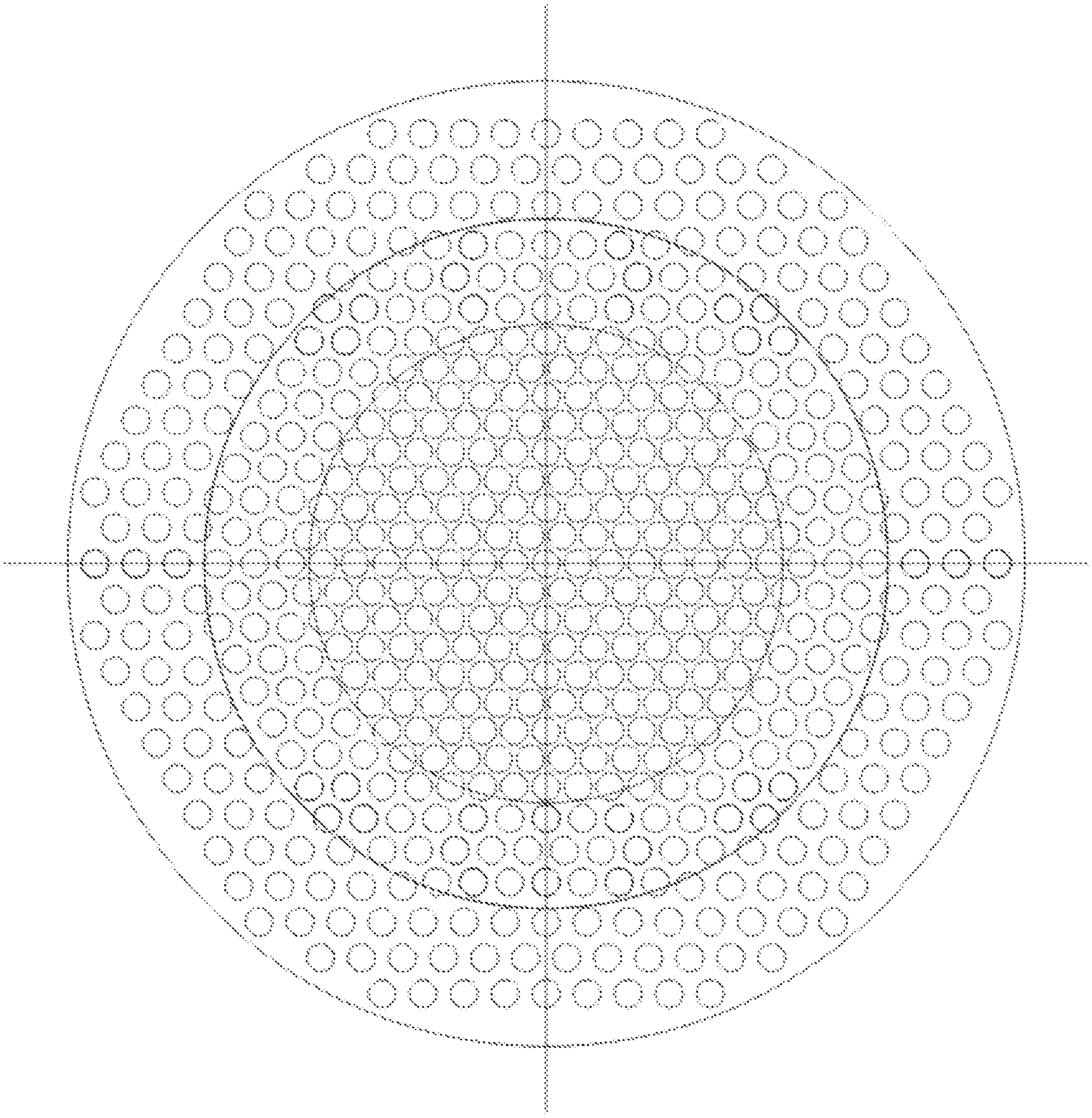
FIG. 8 shows a top view of a cylindrical lens containing the dielectric tubes having equal diameter and having three areas with different distances between the dielectric tubes. The detail of the conductive elements is not shown.
Figure 9:
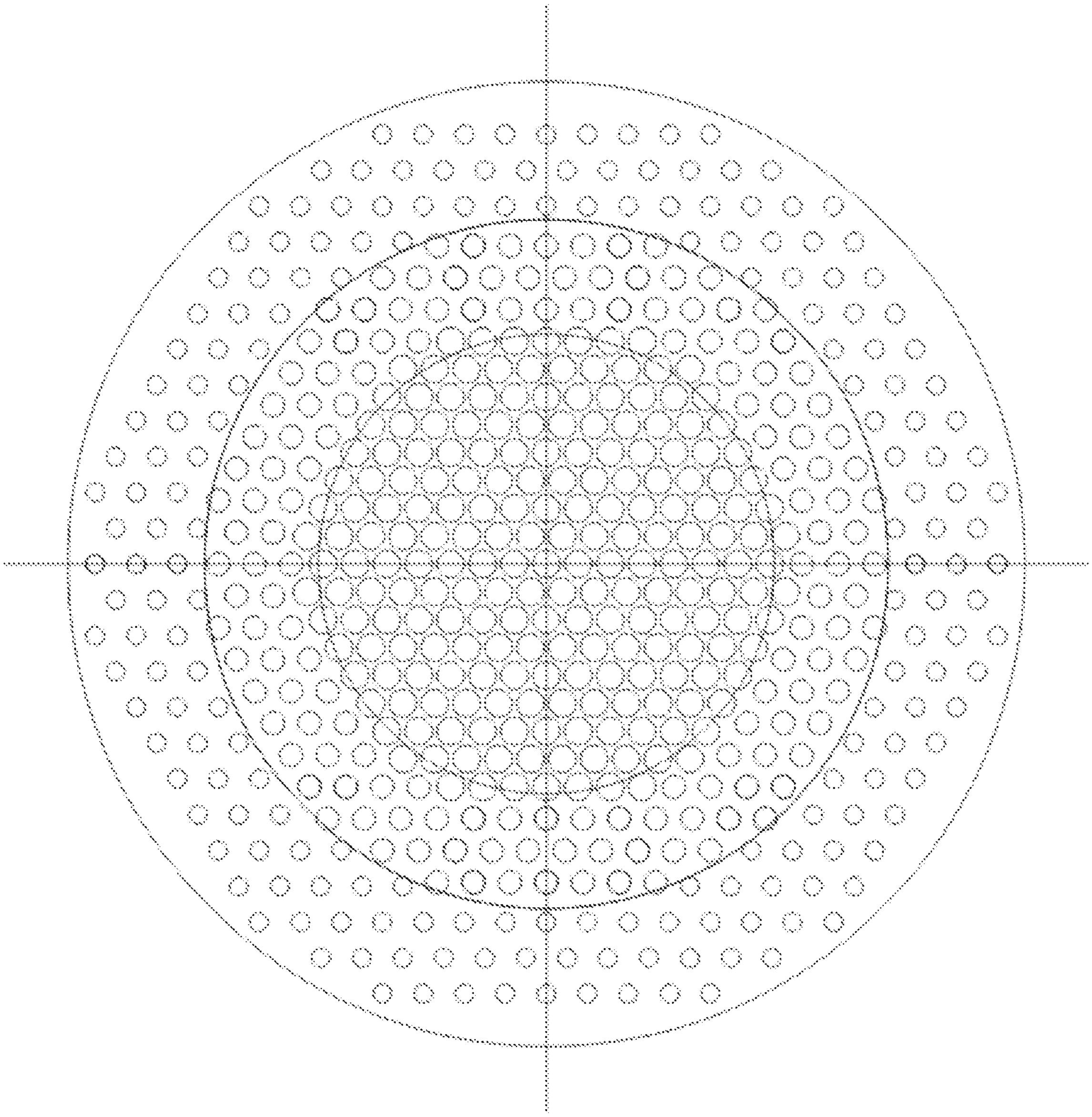
FIG. 9 shows a top view of a cylindrical lens containing the dielectric tubes having three different diameters and forming three areas containing the provided dielectric tubes of different diameter with greater distance between neighbouring tubes towards the outer contour of the cylindrical lens. The detail of the conductive elements is not shown.
Figure 10:
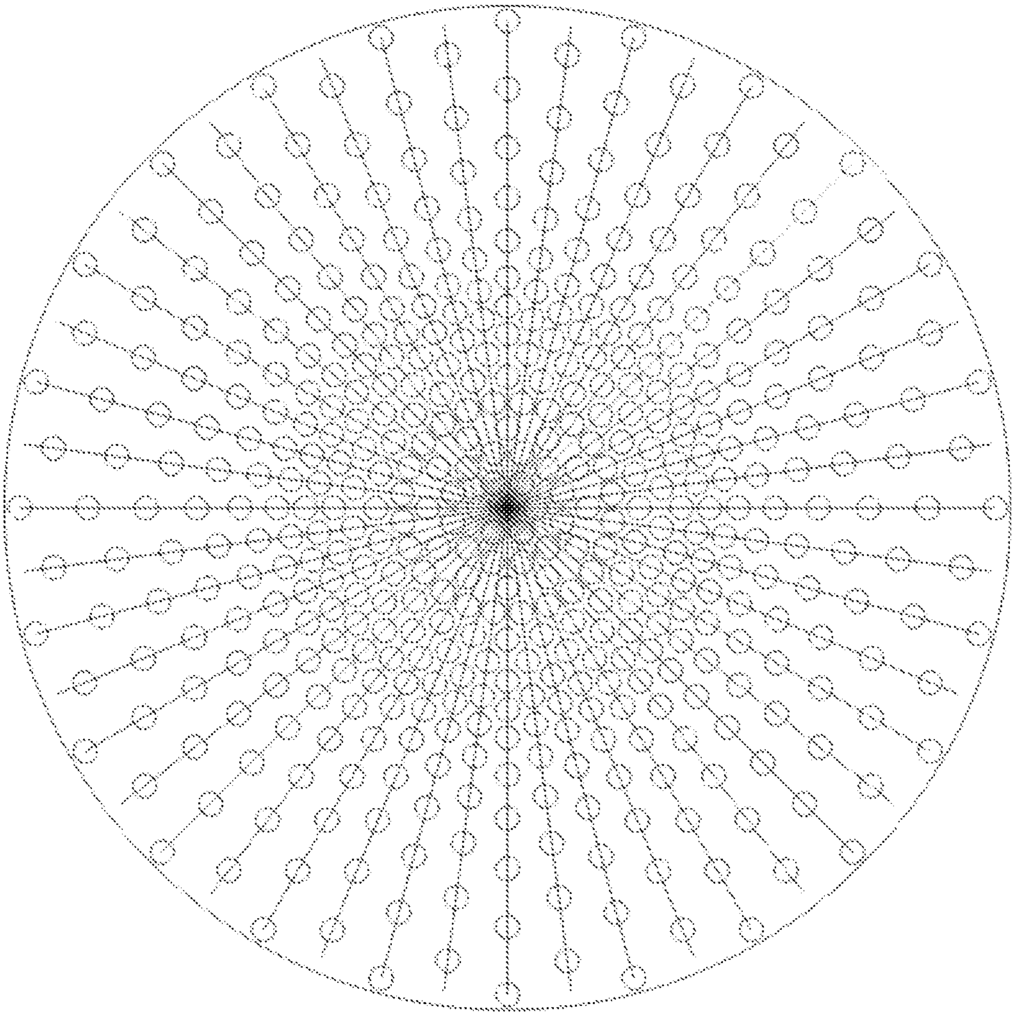
FIG. 10 shows a top view of a cylindrical lens formed containing dielectric tubes having equal diameter which are disposed along the radiuses of a cylinder, where the distances between the dielectric tubes are progressively larger towards the outer contour of the cylindrical lens than the distances between the tubes near the central axis of the cylindrical lens. The detail of the conductive elements is not shown.

FIGS. 8-10 provide examples of cylindrical lenses of different embodiments of the present invention which provide decreasing C towards the outer contour of the lenses. The conductive elements disposed on the surface of the dielectric tubes could have any shape and these are present but not shown in FIGS. 8-10.

FIG. 8 shows a top view of a cylindrical lens containing dielectric tubes having equal diameter and forming three areas with different distances between the dielectric tubes.

The first area is the circle closest to the central axis of the lens. The second area is the first ring outside this first area circle. The third area is the second ring closest to the outer contour of the lens. Distances between neighboring dielectric tubes in the first area are smaller than distances between neighboring tubes of the second area, and distances between neighboring tubes of the first area are smaller than distances between the tubes of the third area as shown in FIG. 8. As a result, ε of the first area is bigger than ε of the second area and ε of the second area is bigger than ε of the third area.

FIG. 9 shows a top view of a cylindrical lens containing dielectric tubes having three different diameters and forming three areas providing different ε. The first area is the circle closest to the central axis of the lens and containing dielectric tubes of the largest diameter. The second area is the first ring outside this first area circle, which contains dielectric tubes having a smaller diameter than those in the first area. The third area is the second ring closest to the outer contour of the lens containing tubes having the smallest diameter. As a result ε of the first area is bigger than ε of the second area and ε of the second area is bigger than ε of the third area.

FIG. 10 shows a top view of a cylindrical lens made with dielectric tubes having equal diameter and being disposed about the central axis of the lens in a radial manner from the central axis of the lens to the outer contour of the lens. The distance between neighbouring dielectric tubes increases towards the outer contour of the lens. As a result such structure provides decreasing E towards the outer contour of the lens.

Figure 11A:
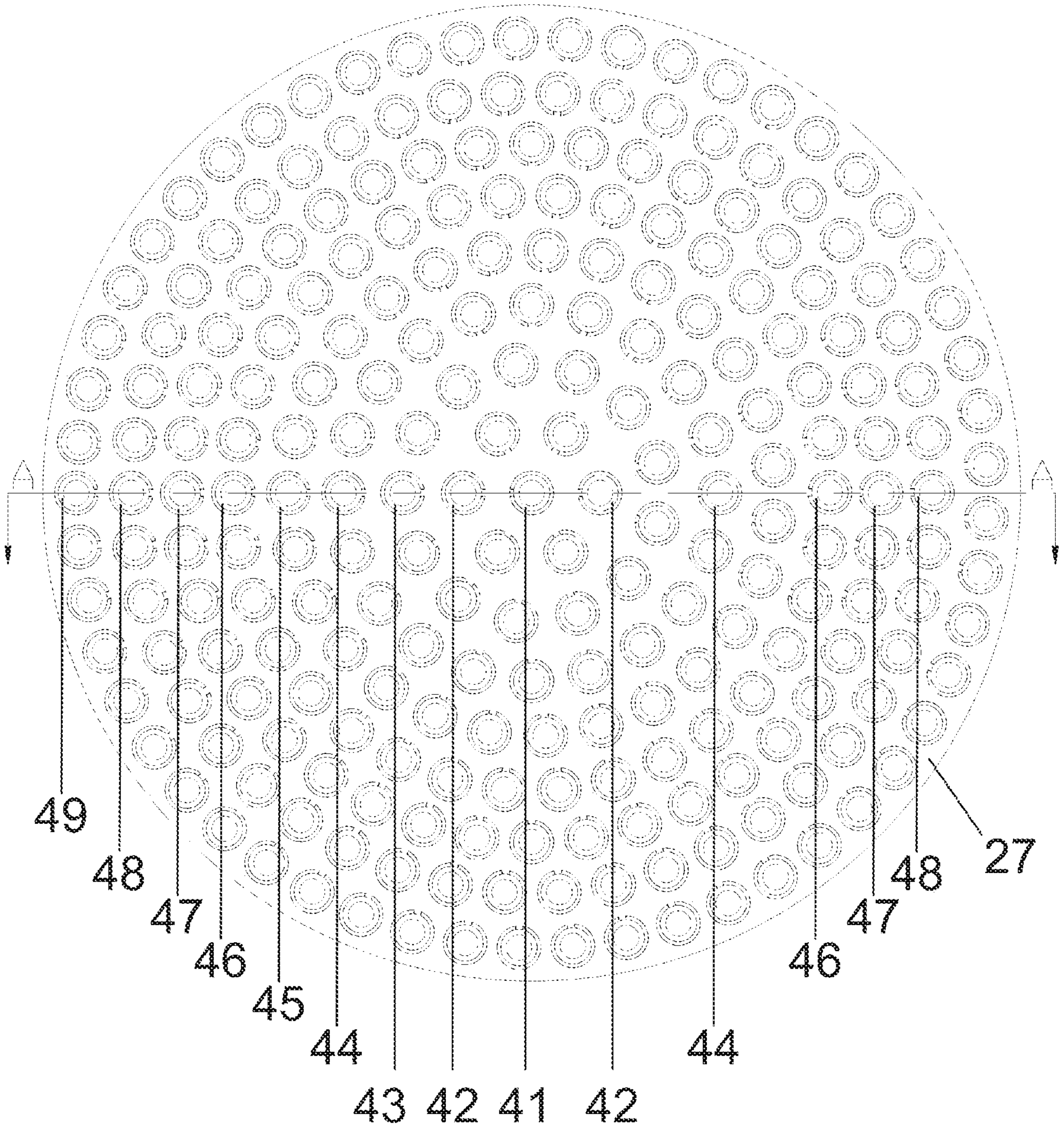
FIG. 11*a* shows a top view of cylindrical and convex lenses formed by dielectric tubes disposed in circles about the central axis of the lens. The conductive elements disposed on the surface of the dielectric tubes are short conductive tubes which include a slit along their length so as to provide a gap between two longitudinal edges.

FIG. 11*a* shows a top view of a cylindrical lens made from dielectric tubes located in holes made in dielectric supporting element 27 having the shape of a thin dielectric circle. The dielectric tubes 41-49 are disposed in a substantially circular array about the central axis of the cylindrical lens. Dielectric tube 41 is disposed at the central axis of the cylindrical lens. Six dielectric tubes 42 form a first substantially circular array surrounding dielectric tube 41. Thirteen dielectric tubes 43 form a second substantially circular array surrounding dielectric tubes 42, and so on, with fifty-three dielectric tubes 49 forming an eighth and largest substantially circular array at or near the outer contour of the cylindrical lens. The conductive elements disposed on the surface of the dielectric tubes have the shape of short tubes with a slit along their length so as to provide a gap between two longitudinal edges.

Figure 11B:
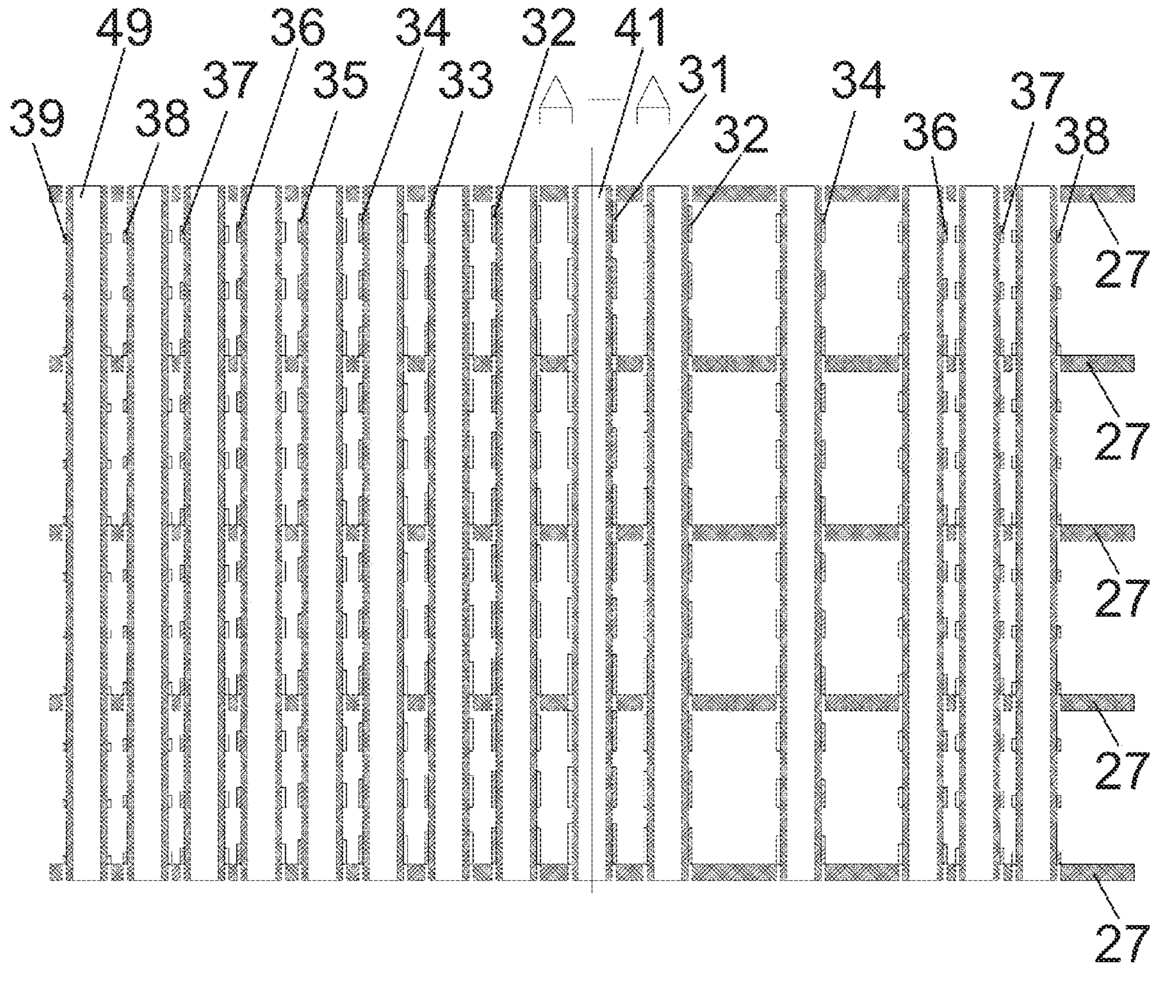
FIGS. 11*b* and 11*c* show cross sections of cylindrical and convex lenses corresponding to FIG. 11*a*, where the conductive elements on the surface of the dielectric tubes have different dimensions and position.

FIG. 11*b* shows a cross section of the cylindrical lens shown in FIG. 11*a* where the length of the conductive elements 31-39 disposed on the dielectric tubes decreases towards the outer contour of the lens, ie. conductive elements 39 are smaller in length than conductive elements 38, which are themselves smaller than conductive elements 37, and so forth. The conductive elements 31 disposed on the surface of the central dielectric tube 41 are the longest in this example, and conductive elements 39 disposed on the surface of dielectric tube 49 are the shortest. The cylindrical lens contains five separate dielectric supporting elements 27 having the shape of a thin dielectric circle. Delay coefficient n of this cylindrical lens increases towards its longitudinal axis, providing better matching of the lens with free space for an electromagnetic wave spreading in the direction perpendicular to the longitudinal axis of the lens. This lens provides focusing properties for an electromagnetic wave spreading in the direction perpendicular to the longitudinal axis of the lens and concentrates an electromagnetic wave on a focus line disposed behind the lens and directed in parallel to the longitudinal axis of the lens.

Figure 11C:
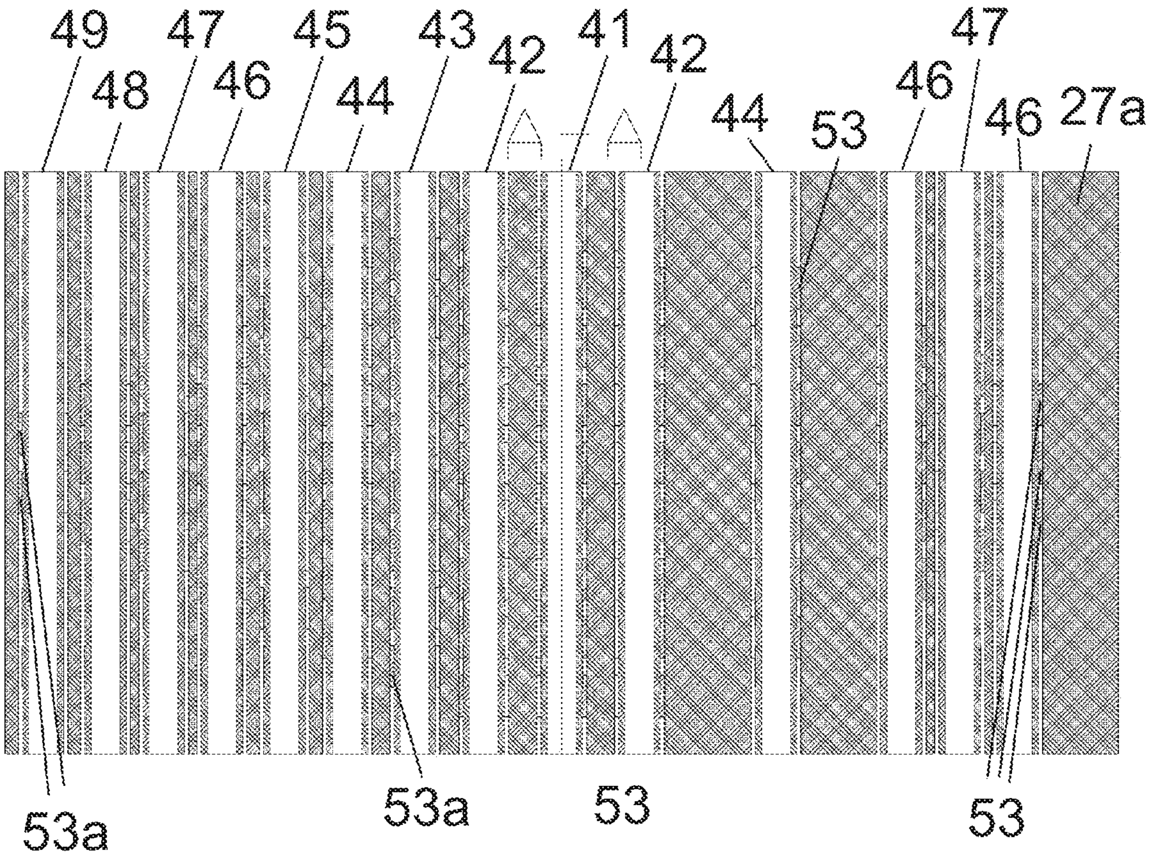

FIG. 11*c* shows a cross section of a convex focusing lens where the number of conductive elements disposed on each dielectric tube decreases towards the outer contour of the lens. The conductive elements 53 disposed on dielectric tubes 41, 42, 44, 46, and 48 are shifted along the dielectric tubes in relation to conductive elements 53*a* disposed on dielectric tubes 43, 45, 47 and 49. This shift increases the capacity between conductive elements 53 disposed on the same dielectric tube and decreases capacity between conductive elements 53 and 53*a* disposed on neighboring dielectric tubes. As a result, the provided artificial dielectric material provides both desirable properties and simplified manufacturing of focusing lenses than other artificial dielectric materials. Supporting dielectric element 27*a* has the shape of a foam dielectric cylinder containing long holes to accommodate the dielectric tubes. Alternatively shaped dielectric supporting elements could be used also to provide desirable properties of the lens dependent on their intended use. This lens can transform a spherical wave radiated by a single radiator disposed at a focal point into a flat electromagnetic wave behind the lens. The area behind the lens where the flat electromagnetic wave is created can then be used for antenna measurement. Instead of using a large far field range where a flat electromagnetic wave is formed at a large distance from a single radiator, it is therefore possible to use a small chamber containing a convex focusing lens creating a flat electromagnetic wave near the lens.

Figure 12A:
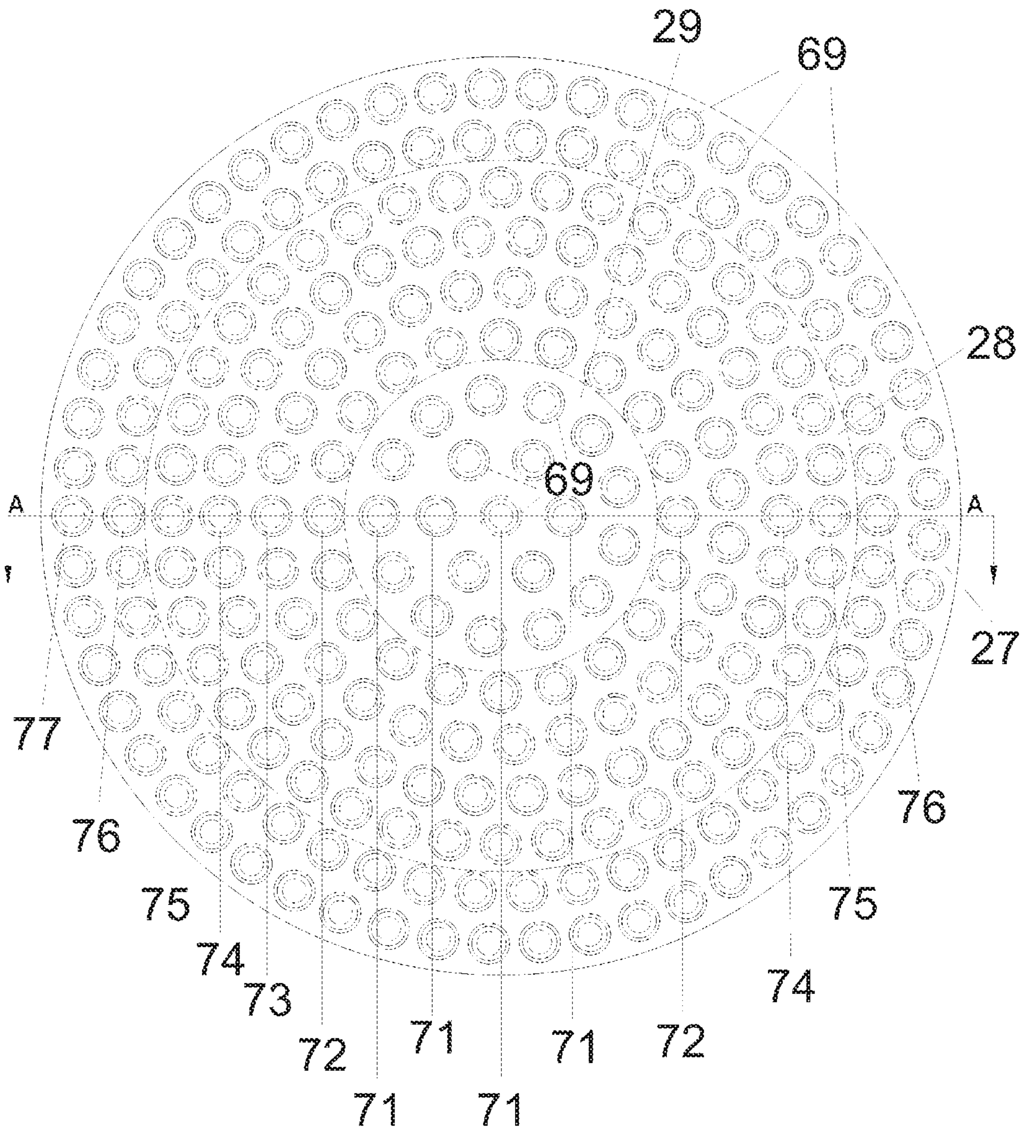
FIG. 12*a* shows a top view of a spherical lens.
Figure 12B:
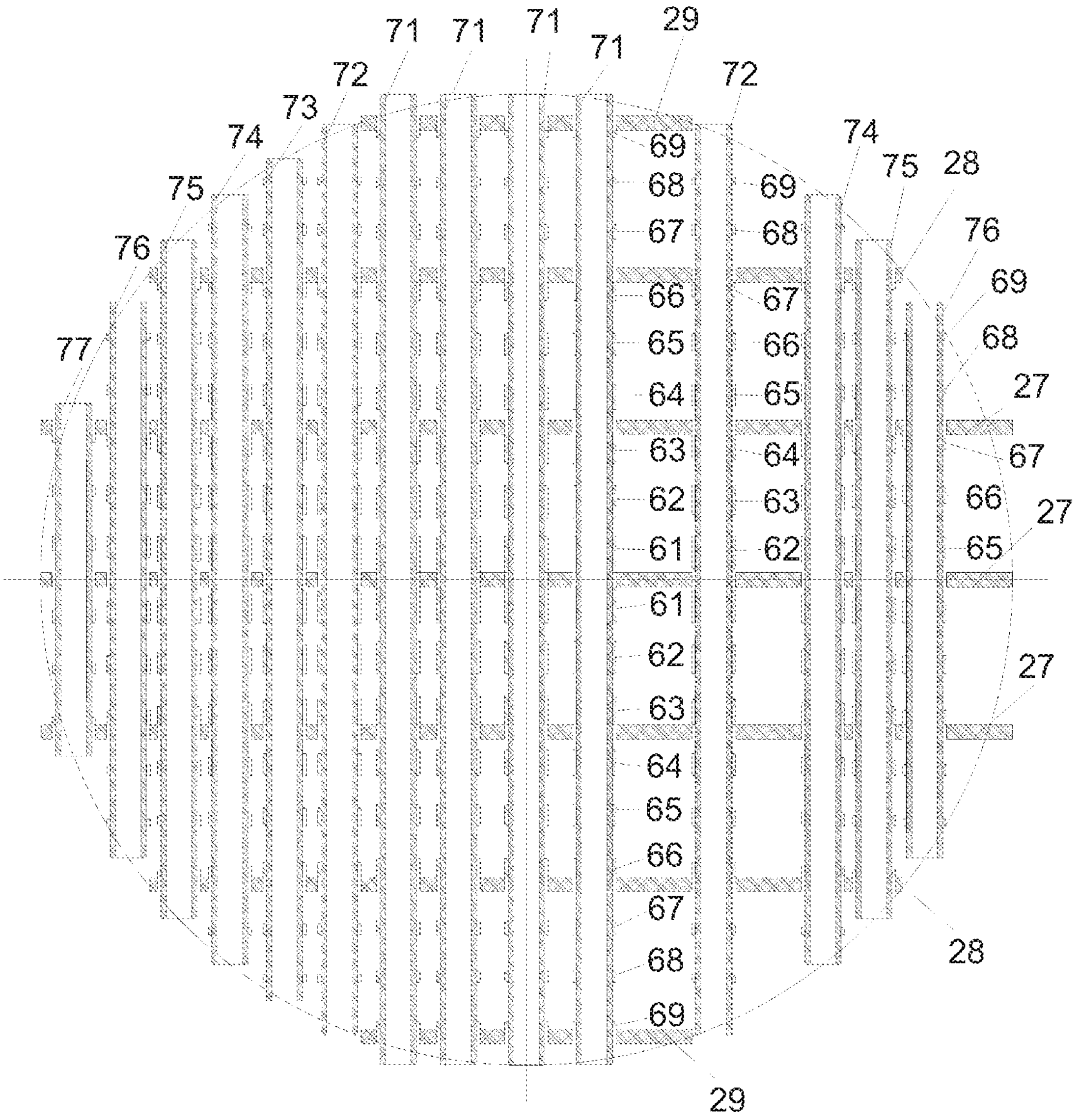
FIG. 12*b* shows a cross section of a spherical lens corresponding to FIG. 12*a*. The dimensions of the conductive elements disposed on the surface of dielectric tubes decrease towards the ends of the dielectric tubes. The quantity of conductive elements disposed on the surface of the dielectric tubes also decreases towards the outer contour of the lens.

A spherical lens is shown in FIGS. 12*a* and 12*b* in top and cross sectional views, respectively.

Length of the conductive elements 61-69 disposed on the dielectric tubes 71-77 decrease towards the ends of the dielectric tubes. The conductive elements 61 disposed at the middle of the dielectric tubes are the longest ones. The conductive elements 69 disposed near the ends of the dielectric tubes and as shown in FIG. 12*a* are the shortest ones. Therefore, in the top view only the smallest conductive elements 69 disposed near the end of each tube are visible ones in this view. The longest tubes 71 are disposed at or near the longitudinal axis of the spherical lens. The shortest tubes 77 are disposed near the outer contour of the spherical lens.

The spherical lens as shown in FIG. 12*b* contains seven dielectric supporting elements having the shape of thin dielectric circles 27-29 and containing holes for the dielectric tubes 71-77. Delay coefficient of this cylindrical lens increases towards the center of the lens providing focusing properties and decreasing reflection of electromagnetic wave from the lens.

The design of such a spherical lens also allows for alteration of the dimensions such as diameter and length of the conductive elements and the dielectric tubes and distances between the conductive elements and the dielectric tubes to provide desirable properties of the artificial dielectric material. This lens could provide focusing properties for an electromagnetic wave spreading in any direction and concentrates electromagnetic wave at a focal point disposed behind the lens.

For example a spherical Luneburg lens having isotropic properties could be created and used for multi-beam antennas. Alternative arrangements include that the dielectric supporting elements for the dielectric tubes could be made in a manner similar to that shown in FIGS. 1*c* and 1*d* or in the shape of a sphere made of a foam dielectric containing holes for installation of the dielectric tubes.

The invention also relates to a method for manufacturing artificial dielectric materials which may be in turn used in the production of lenses comprised of the provided artificial dielectric materials. The method involves several stages. The first stage is manufacturing of an artificial dielectric material having conductive elements, dielectric tubes and dielectric supporting elements comprising partially covering a plurality of dielectric tubes with a plurality of conductive elements, and fixing and separating the dielectric tubes from each other by way of one or more dielectric supporting elements. The artificial dielectric material can be adapted to the shape of an appropriate lens.

Focusing properties of a lens depends on the dimensions of the conductive elements and dielectric tubes and their disposition and relative orientation after fixing the conductive elements on the dielectric tubes and fixing the dielectric tubes by the supporting dielectric parts. Using these variable factors and the corresponding properties they provide, different kinds of lenses could be provided.

The invention also relates to a method of focusing a radio wave using a focusing lens according to the invention. Such lens may be preferably cylindrical or spherical or may have other geometry. Use of such a focusing lens comprising the artificial dielectric material and conductive elements disposed on the dielectric tubes according to the invention allows focusing of radio waves with less dependence on direction and polarization of electromagnetic waves.

While some preferred aspects of the invention have been described by way of example, it should be appreciated that modifications and/or improvements can occur without departing from the scope of the invention as claimed in this specification.

The terms comprise, comprises, comprising or comprised, if and when used herein, should be interpreted non-exclusively, that is, as conveying "consisting of, or including".

It is to be understood that, if any prior art or publication is referred to herein, such reference does not constitute an admission that the publication forms a part of the common general knowledge in any country.

The invention claimed is:

1. An artificial dielectric material, for a focusing lens, comprising a plurality of dielectric tubes supported by one or more dielectric supporting elements which fix and separate the dielectric tubes from each other, wherein a surface of each dielectric tube is at least partially covered by at least one conductive element.

2. The artificial dielectric material according to claim 1, wherein the dielectric tubes have a cross section in the shape of a circle or a polygon.

3. A method for manufacturing an artificial dielectric material according to claim 2 for a focusing lens, comprising: partially covering a plurality of dielectric tubes with a plurality of conductive elements, and fixing and separating the dielectric tubes from each other by way of one or more dielectric supporting elements.

4. The artificial dielectric material according to claim 1, wherein the distances between neighboring dielectric tubes are equal.

5. The artificial dielectric material according to claim 1, wherein the distances between neighboring dielectric tubes are unequal.

6. The artificial dielectric material according to claim 1, wherein the dielectric tubes form a substantially circular, substantially square, or substantially hexagonal array.

7. The artificial dielectric material according to claim 1, wherein the or each dielectric supporting element, which fixes and separates the dielectric tubes from each other:

a) is a thin dielectric sheet containing holes for the dielectric tubes; or b) is a foam dielectric material containing holes for the dielectric tubes; or c) are rods disposed in holes made in the dielectric tubes and washers disposed on the rods between the dielectric tubes.

8. The artificial dielectric material according to claim 1, wherein the, or each conductive element is a short conductive tube.

9. The artificial dielectric material according to claim 8, wherein the or each conductive tube has a length in the range 0.2-5.0 times the diameter of the tube.

10. The artificial dielectric material according to claim 1, wherein the or each conductive element:

a) is a short conductive tube having a slit along its length so as to provide a gap between two longitudinal edges; or b) is a short conductive tube containing slots in the material of the tube.

11. The artificial dielectric material according to claim 1, wherein the conductive elements are made of aluminium or of a conductive adhesive tape.

12. A focusing lens made of the artificial dielectric material according to claim 1.

13. The focusing lens according to claim 12, wherein the focusing lens is a cylindrical focusing lens.

14. The focusing lens according to claim 12, wherein the focusing lens is a spherical focusing lens.

15. The focusing lens according to claim 12, wherein the focusing lens is a convex focusing lens.

16. A focusing lens according to claim 12, wherein the dielectric tubes are disposed in a symmetrical manner about the central axis of the lens, or are disposed in a substantially circular array about the central axis of the lens, or are disposed in a substantially hexagonal array about the central axis of the lens, or are disposed radially about the central axis of the lens.

17. The focusing lens according to claim 12, wherein the distances between neighbouring dielectric tubes are progressively larger towards the outer contour of the lens than the distances between neighbouring tubes near the central axis of the lens.

18. The focusing lens according to claim 12, wherein the diameters of the dielectric tubes are progressively smaller toward the outer contour of the lens than the diameters of the dielectric tubes near the central axis of the lens.

19. The focusing lens according to claim 12, wherein the length of each of the conductive elements disposed on the dielectric tubes decreases towards the ends of the dielectric tubes, and/or wherein the distances between the conductive elements disposed on the dielectric tubes decreases towards the ends of the dielectric tubes, and/or wherein the number of conductive elements disposed on each dielectric tube decreases towards the outer contour of the lens.

20. The focusing lens according to claim 12, wherein the dielectric tubes disposed furthest from the central axis of the focusing lens include the one or more conductive elements at or near the middle of the dielectric tube and not at or near the ends of the tubes.

* * * * *